United States Patent [19]

Buchanan et al.

[11] Patent Number: 5,419,017
[45] Date of Patent: May 30, 1995

[54] BELT SEAMING

[75] Inventors: Robert D. Buchanan, Raleigh, N.C.; Ian C. Sayers, Lancashire, United Kingdom

[73] Assignee: Scapa Group PLC, Lancashire, United Kingdom

[21] Appl. No.: 887,952

[22] Filed: May 26, 1992

[30] Foreign Application Priority Data

Jun. 5, 1991 [GB] United Kingdom ............ 9112071

[51] Int. Cl.⁶ ............................................. F16G 3/00
[52] U.S. Cl. ................................. 24/33 R; 24/31 R
[58] Field of Search ............ 24/32, 31 R, 33 P, 33 B, 24/38, 31 V, 35, 573.2, 33 R, ; 198/844.2

[56] References Cited

U.S. PATENT DOCUMENTS

| 88,307 | 3/1869 | Koeb et al. | 24/35 |
| 210,518 | 12/1878 | Glover | 24/35 |
| 1,198,168 | 9/1916 | Thaison | 24/35 |
| 3,109,212 | 11/1963 | Emery | 24/573.2 X |
| 4,212,094 | 7/1980 | Pray | 24/33 B X |
| 4,945,612 | 8/1990 | Talonen | 24/31 R |

FOREIGN PATENT DOCUMENTS

| 274244 | 7/1988 | European Pat. Off. |
| 441412 | 8/1991 | European Pat. Off. |
| 2706578 | 8/1978 | Germany |
| 3527599 | 2/1987 | Germany |
| 8812667 | 1/1989 | Germany |

Primary Examiner—James R. Brittain
Attorney, Agent, or Firm—Keck, Mahin & Cate

[57] ABSTRACT

A temporary seaming bridge (62) for connecting two belt ends (26,27) during seaming comprises a bridge portion (63) with a plurality of pegs (34,35) provided at each end. The pegs (34,35) are complementary with apertures (28,29) provided in the belt ends (26,27) such that the pegs (34) at one end of the bridge engage the apertures (28) in one belt end (26) and the pegs (35) of the other end of the bridge engage the apertures (29) in the other belt end (27).

8 Claims, 3 Drawing Sheets

BELT SEAMING

This invention relates to the joining together of two belt ends using a hinge or pintle wire to form a flexible joint. To enable such a seam to be formed, each belt end is provided with outwardly extending loops or other formations. When loops are provided they are interdigitated and the pintle wire is passed along a tunnel formed by the interdigitated loops, It will be appreciated that in order that the wire can be passed the full length of this seam (which in some cases can be up to 10 meters in length) it is important that the interdigitated loops overlap precisely and provide a clear tunnel through which the relatively thin pintle wire can be passed. In order to maintain the loops in their desired configuration during introduction of the wire, it is usual to employ some temporary seaming aid which maintains the interdigitated relationship of the loops and is discarded when the seam has been made.

The invention is particularly concerned with dryer fabric belts which are used in the drying section of papermaking machines. It is to be understood, however, that the invention has relevance to belts for all purposes-for example filter belts, conveyor belts and machine drive belts.

Specifically in relation to dryer fabrics, seaming is a problem in that it usually has to be effected manually with the belt in position on the machine. Conditions are not ideal for working, and the exact position in which seaming has to take place cannot be easily determined because if the belt to be seamed is not fed in so that its ends are in exactly the correct position it is quite difficult to inch a very large machine to put the belt in a more favourable position. In these circumstances it is usual to seam the belt wherever the ends are disposed, unless the position is absolutely impossible. For this reason, it is important that seaming aids are as simple and as speedy as possible. It has to be understood that for a large and expensive piece of machine such as a papermaking machine every minute that the machine is stopped is costing the user money. Quick and efficient seaming is, therefore, at a premium.

European Patent Application No. 87310922.7 and Application No. 91104708.2, disclose several old methods of dryer fabric seaming using temporary seaming aids. Of those described, the most commonly used and favoured heretofore have been-the "zipper" and the "Velcro" system. The "Velcro" system is shown in FIGS. 1 and 2. In these figures the belt ends 10 and 11 are each provided with formations in the form of respective loops 12,13 which are desirably interdigitated to form a tunnel 14 through which can be passed a pintle wire 15. As a temporary seaming aid each belt end 10, 11 is provided with a pair of "Velcro" (that is to say hook/pile, pile/hook, or comparable pressure-sensitive fabric or other temporarily attachable formations) strips 16, 17, 18, 19. Each pair of strips is provided one on each face of the fabric (to allow seaming from both sides) and the strips 16, 17, 18, 19 are sewn to the belt ends, desirably by the same stitching so as to minimise sewing operations and also desirably by chain stitch so that after use they can be removed easily.

In seaming from the top, the belt ends are supported on a flat surface (not shown) and a bridge of complementary Velcro is attached to the strip 16. The two ends of the belt are then urged together and the free end 20a of the bridge 20 engaged with the Velcro strip 18 to maintain the formations 12, 13 in their desired interdigitated condition. When this has been done the pintle wire is passed through the tunnel 14. The bridge 20 can be continuous along the length of the seam, being attached sequentially from one end, the pintle wire following the attachment along the seam. Alternatively, the bridge 20 can be in the form of a plurality of individual bridge members as shown in FIG. 2 spaced apart along the length of the seam. This enables the condition of the interdigitation to be inspected at intervals along the seam and if the pintle wire should become stuck, the position of the blockage can be ascertained and the belt adjusted to remove it.

This arrangement has several disadvantages. Firstly, the Velcro strip 16, 17, 18, 19 has to be sewn to the belt ends 10, 11 in such a way that they can bear the full tension of the belt (which can be quite considerable) and yet can be released easily. Further, the actual sewing of the strips is time consuming, the sewing can damage the fabric, and, if the belt ever has to be removed from the machine (for example for repair to the belt or to the machine itself) it cannot be replaced without first replacing the strips 16, 17, 18, 19. Some paper mills do have the facility for sewing their own strips, but many do not. In the latter case, there will be delay and expense whilst the fabric is returned to the manufacturer for re-attachment of the strip.

Referring particularly to FIG. 2, it might be thought by careful sewing of the strips 16, 17 so as to make the distances d precisely known and constant, and by selecting the length $L_1$ of the strip 20 to be equal to the length $L_2$ from the outer edges of the strips 16, 17 automatic accurate positioning of the formations 12, 13 could be achieved. Unfortunately, in practice the sewing of the strips 16, 17, 18, 19 has to be effected by means of a sewing machine which moves relative to the belt (in view of the fact that the belt is usually of very significant width and cannot easily be used in relation to a fixed sewing machine) and therefore accurate maintenance of the distances d is not feasible to within the very low tolerances required. In addition, the nature of the Velcro material makes its positioning in relation to the strips impossible to the accuracy required.

FIG. 3 illustrates the zipper system. In this case the parts of the belt have been given similar reference numerals. Here a bridge is formed by a zipper, one of whose stringers 21 is sewn to the belt end 10 by chain stitches 22 and the other of whose stringers 23 is sewn to the belt end 11 by chain stitch 24. This sewing is effected with the stringers separate. Upon seaming, the clasp 25 is operated to unite the stringers and, hopefully, to draw the formations 12, 13 to a position where they form a clear tunnel 14. The pintle wire is then moved along the seam. If the pintle wire should jam, the clasp can be moved back and the belt manually adjusted so that the pintle wire can pass easily. In practice, a four-clasp fastener is desirable, a central pair of clasps being movable to expose any section of the seam where pintle wire progress is impaired. This system works quite well. It does, however, have the same disadvantage as the Velcro system in that once the stringers 21, 23 have been removed, the belt cannot easily be seamed if it has to be removed from the machine. In addition, if the stringers 21, 23 have not been sewn exactly parallel to the belt ends, operation of the clasp 25 may not be sufficient to draw them into accurate inter-engagement. In this case manual adjustment is necessary and is not very easy.

It is an object of the present invention to reduce or obviate all the above disadvantages apparent in relation to papermachine dryer fabrics and to improve belt end joining in many other applications.

According to the invention there is provided, for use with a pair of belt ends each having an array of apertures, a temporary seaming bridge capable of extending between the belt ends and having on each side a plurality of pegs complementary to the array of apertures in the relevant fabric end.

The invention also provides a combination of a pair of belt ends, each belt end being provided with a plurality of apertures, and a temporary seaming bridge capable of extending between the two ends and across a seam area and having on each side a plurality of pegs complementary to the apertures in the belt end.

The invention also provides a method of forming a seam between a pair of belt ends provided with complementary hinge-forming formations, including the steps of providing apertures in each belt end, providing a temporary seaming bridge capable of extending across the proposed seam and overlying the apertures in each belt end, providing on the bridge at each side a plurality of pegs complementary to the formations in the belt end, arranging the belt ends to place the formations in a desired disposition engaging the pegs on each side of the bridge with the apertures in the corresponding belt end to restrain the belt ends against separation in the belt length direction during seaming; and removing the bridge after seaming.

The belt ends can be the two ends of a single belt, the ends being joined to produce an endless loop. Alternatively, the belt ends can belong each to a separate belt, the other ends of the belt being joined either to each other or to other belt sections to produce an endless assembly having several individual belts within it. Normally, the apertures in one belt end will be of the same size and disposition as the apertures in the other belt end.

In some cases, however, it can be possible for the apertures to be of different sizes and the pegs on the bridge can be shaped and disposed accordingly.

On each belt end it can be the disposition and/or the size of the apertures which is different.

The apertures can be provided only at the belt ends, or can be provided throughout the length of the belt. In the case of a papermaking machine dryer fabric the apertures will extend over the full length of the belt and provide the essential permeability of the fabric. In other applications, however, where porosity throughout the length of the belt is not important apertures can be provided only at the belt ends to facilitate a seaming function.

Desirably the material of the pegs will be slightly harder than the material of the belt in order that the pegs can be introduced into the belt and removed therefrom without danger of the pegs coming detached and remaining in the belt. This stronger construction of the pegs on the bridge also allows the bridge to be re-used many times.

Usually, the apertures in the belt will be of constant cross section. However, in the case that the apertures are not of constant cross section, for example in a case where the apertures increase in cross sectional area from one side to the other, different bridge members can be provided for use from different sides of the belt. The apertures can be circular, square, diamond-shaped or of any other convenient shape, the pegs on the bridge being shaped accordingly. It will be appreciated, of course, that the pegs do not have to be exactly the same shape as the apertures provided that they are a sufficient fit therein to restrain the belt against opening of the seam due to longitudinal belt tension after the bridge has been applied. Thus, a bridge having round pegs could be used in connection with a belt having square apertures, provided the shape of the pegs is selected accordingly. The pegs can be shaped to be the same shape as the apertures but again, can be different therefrom. For example, the pegs can be solid or can be non-solid so as to resiliently engage the apertures. For example, the pegs could be hollow so as to be compressible, or could be made of H-shaped, Z-shaped, I-shaped or of some similar cross section in order that they can be resiliently urged into the apertures and retained there during seaming by the resilience of the peg. Alternatively, the pegs could be solid and rigid, for example being formed from metal and being retained in the apertures by the resilience of the material of the belt.

Desirably, the apertures in the belt are arranged in a regular array, for example in lines transverse to the belt direction thus enabling the separation between the belt ends with the bridge engaged to be varied. Thus, with the bridge attached to one belt end, the separation of the two belt ends can be adjusted and then the pegs on the other side of the bridge engaged with those apertures of the other belt end which are most conveniently disposed relative to the pegs on the otherside of the bridge.

In carrying out the method it is possible to mark a line of apertures at a predetermined distance from each belt end and provide a bridge of a precisely defined length which is relatively inextensible. By engaging selected bridge pegs precisely with the marked lines of apertures on each belt end, it can be ensured that the separation of the two belt ends is a predetermined value. Repeating this operation along the length of the seam results in the creation of a perfect inter-relationship between the joint forming formations of the belt ends.

The hinge-forming formations of the belt ends can conveniently be loops which are engaged by a pintle wire. However, alternative forms of joints can be provided.

It can be advantageous to facilitate movement of the belt to a position commensurate with the precisely desired inter-relationship of the hinge formations by engaging the apertures in the belt to vary the extremity-to-extremity gap at the seam. With this in view the invention further provides a tool for use in the creation of a seam between a pair of belt ends each provided with a plurality of apertures, comprising a foot having a plurality of pegs complementary to the apertures on the belt end and a handle upstanding from the foot.

The tools can be supplied in pairs usually with pegs of the same size and disposition to deal with a pair of identical belt ends. Of course, if belt ends are not identical a pair of tools each different from each other can be provided.

It has been found convenient to manufacture a bridge member in the form of a strip of 50 Shore D hardness thermoset polyurethane having a web thickness of 2 to 3 mm and peg sizes depths and dispositions to suit the belt with which it is to be used.

In this case the bridge strip can very conveniently be made by casting over a piece of the belt with which it is to be used to produce precisely registering pegs.

A bridge strip can of course be made from by moulding, machining or by other forming methods.

The invention will be described further, by way of example, with reference to the accompanying drawings wherein.

Figure 1:
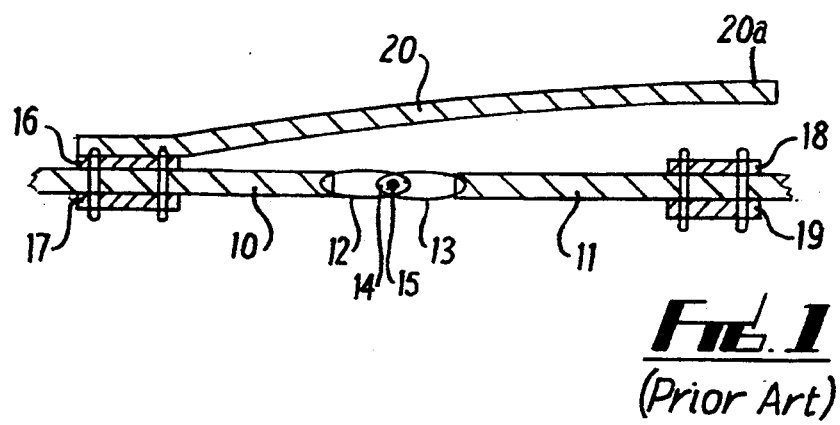
FIG. 1 is a side elevation, partly in cross section, showing a known belt seaming system.
Figure 2:
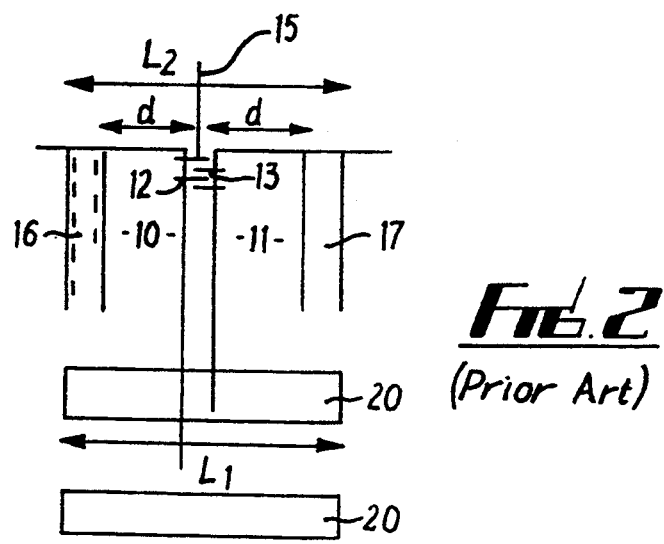
FIG. 2 is a plan view showing the system of FIG. 1.
Figure 3:
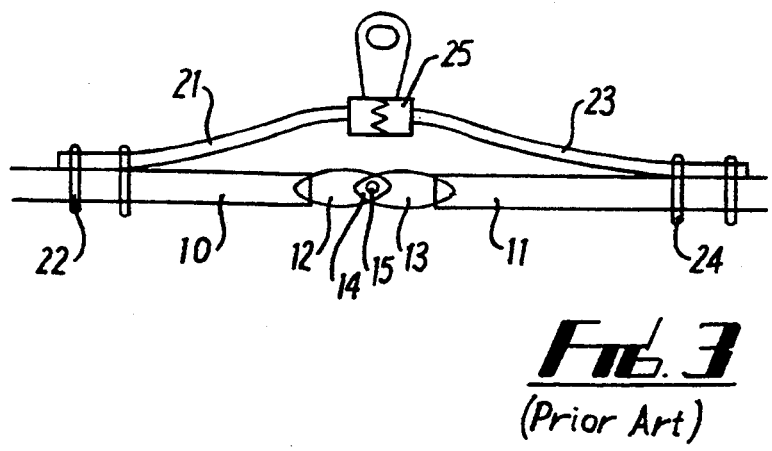
FIG. 3 is a end elevation illustrating a second known seaming system.

As FIGS. 1, 2 and 3 have been referred to comprehensively in the introduction they will not be further referred to.

Figure 4:
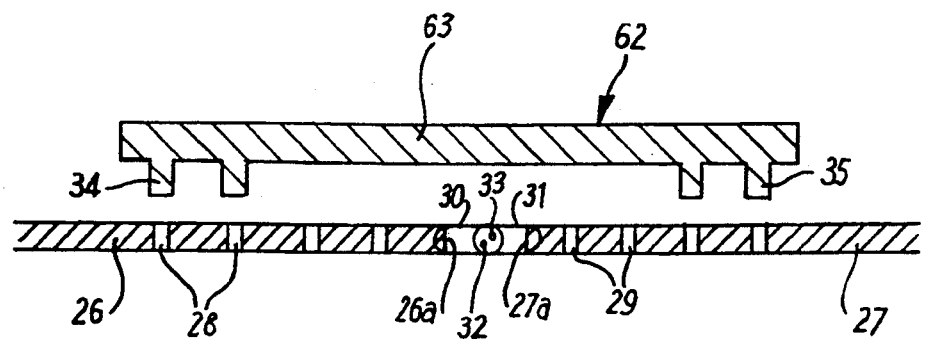
FIG. 4 is a longitudinal cross section view illustrating the seaming of a pair of belt ends in accordance with the invention.
Figure 5:
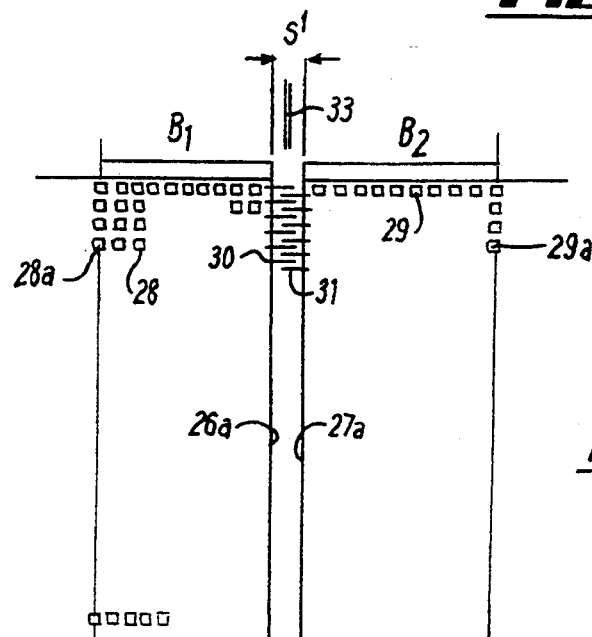
FIG. 5 shows the belt ends of FIG. 4 (on a larger scale) in plan view, and a complementary bridge piece in side elevation.

Turning now to FIGS. 4 and 5, it will be seen that the invention is in use in relation to a pair of belt ends 26, 27. The belt ends 26, 27 could, of course, be ends of different belt lengths and apertures formed therein could be formed specifically for seaming purposes. However, it will be assumed for the purposes of this specific description that the apertures in the belt ends are uniformly provided throughout the belt so as to provide porosity and to allow the belt to function as a dryer fabric in a papermaking machine.

As has been mentioned, each belt end has apertures 28, 29 only those adjacent the extremities 26a, 27a being shown. As best seen in FIG. 5, the apertures are, in this particular instance, square apertures of constant cross section arranged in a regular grid array. In a typical belt the apertures can be 1 mm square and spaced 1 mm apart. Adjacent the belt extremities 26a, 27a, respective hinge forming formations in the form of loops 30, 31 are provided which, in their ideal disposition create a tunnel 32 for a pintle wire 33. As will be appreciated from the Figures, it is important that the separation S between the belt extremities 26a, 27a, is kept within a very narrow range of values in order to ensure that an adequate tunnel 32 is provided for easy passage of the pintle wire 33.

In seaming such two belt ends 26, 27 in accordance with a preferred method of the invention the separation S is adjusted to its desired value over a limited length of the belt. This is done manually by sliding the belt against a suitable surface or by using a pair of tools as later described. When that position has been achieved a preferred bridge 62 of the invention is used to secure the adjacent belt end portions together. The bridge comprises a strip like body 63 which has at each side thereof a plurality of projecting pegs 34, 35 complementary to the apertures 28, 29 respectively. In FIG. 4 the bridge 62 is shown schematically simply as having two pegs on each side. In practice there will usually be a significant number of pegs in order to apply a significant tension to the belt to prevent increase in the separation S. It will be appreciated that the pegs 34 at one side of the bridge 62 can be applied prior to adjustment of the separation S, the pegs 35 being applied later.

The pegs 34 and 35 can extend directly from a strip like member or body 63 but could conveniently depend from platforms on the lower surface of the body 63 so that the central portion of the bridge can extend across the loops 30, 31 without interfering with them. The apertures in the belt ends 26 and the array of pegs on the bridge 62 are desirably in a regular array as better shown in FIG. 5. In this case it is desirable if the lengthwise separation of the various rows of apertures is firstly constant and secondly is small compared with the size of the tunnel 32 so that a fine adjustment of the mutual interdigitation of the formations 30, 31 can be achieved by moving the relative positions of engagement of the pegs and apertures.

In FIG. 4, the spacing of the apertures and pegs is shown to be significantly greater in relation to the size of the pintle tunnel than would be the case in practice.

FIG. 5 illustrates a particular advantage of the bridge and method of the invention. It will be seen that the apertures 28 and the apertures 29 are arranged in a regular array of lines which extend parallel to the extremities 26a, 27a. In manufacture it will be usual to ensure that the distance from the first line of apertures adjacent the relevant extremity will be constant. Thus, by selecting a row of apertures such as row 28a or row 29a each at spacings $B_1$, $B_2$ from the relevant extremity 26a, 27a (here it should be noted that $B_1$ does not have to be equal to $B_2$) and by providing a bridge 32 wherein the distance between selected pegs 34, 35 is equal to $B_3$, wherein B is equal to $B_1+B_2+S$, and by engaging the selected pegs 34a, 35a with the marked row of apertures 28a, 29a it can be ensured that the separation S is exactly that desired for easy entry of the pintle wire and the simple formation of the hinged joint. This is a tremendous advantage over prior systems wherein it has never been possible to achieve such accuracy, especially such accuracy which does not even require inspection of the pintle tunnel but merely the engagement of marked pegs on the bridge with marked apertures on the belt.

In relation to FIGS. 4 and 5 it has been indicated that the bridge 62 is in the form of a strip which covers only a relatively short longitudinal extent of the seam. This is a convenient possibility, a plurality of bridges 32 being provided at spaced or at closely adjacent positions along the length of the seam. This does allow individual bridges to be lifted and the seam there beneath inspected if it should happen that trouble is met during introduction of the pintle wire. However, using the system described in relation to the marked lines of the apertures, it should be possible to use a single continuous strip bridge right across the belt and it may well be that in such circumstances there is no need for regular inspection of the seam. This, of course, would greatly facilitate seaming, as a large number of individual bridges would not need to be used.

It will be appreciated that the seaming bridge and the seaming method of the invention greatly facilitates the formation of a joint between two belt ends. Firstly there is no need to make any attachment to the belt ends by sewing or any comparable operation. The strips 16, 17, 18, 19 (FIG. 1) and the stringers 21, 23 (see FIG. 3) do not have to be sewn beforehand and then detached later. The belt is simply placed on the machine as supplied and the bridge or bridges used separately and connected to the belt. If the belt needs to be removed from the machine for any purpose, for example for repair of the belt or repair of the machine it can easily be re-seamed after replacement without the need for replacement of the temporary seaming strips 16 to 19 or 21 to 23. Seaming can easily be carried out by relatively unskilled labour at the site rather than the whole belt having to be either sewn carefully or even returned to the manufacturer for re-sewing.

The invention is not limited to the precise details of the foregoing and variations can be made thereto.

It has been stated that the pegs need to be complementary to the apertures. It should be noted that the pegs do not need to be of similar shape, they simply need to be disposed at complementary spacings, and be capable of engaging in the apertures to restrain the belt ends against movement leading to seam separation.

Figure 6:
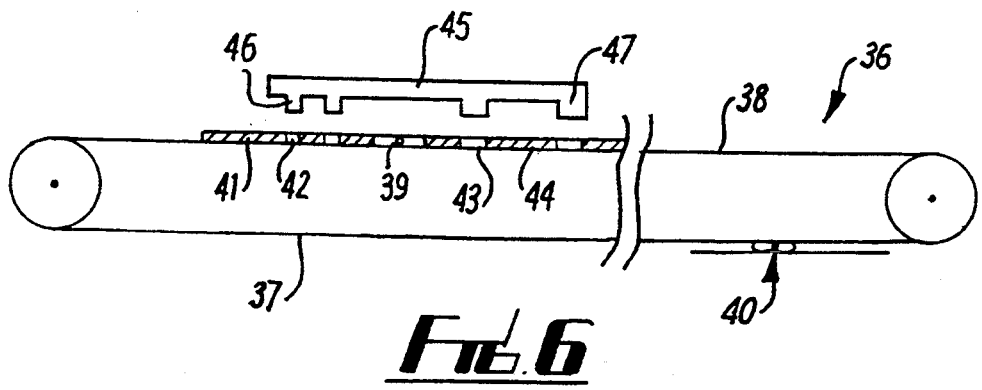
FIG. 6 illustrates a variation.

Although square holes of constant cross section have been described, holes of very many different dispositions and of different sizes and shapes can be used. FIG. 6 illustrates one possible variation. Here, a belt assembly 36 comprises two belt lengths 37, 38 joined by two seams 39, 40. The belt length 37, 38 can have apertures which are of different size and/or spacing. It will be seen that the end 41 of belt length 37 has apertures 42 which are smaller and closer together than apertures 43 in the end 44 of belt 38. Seaming of the ends 41, 44 is simply effected by using a bridge 45 which on one side has pegs 46 complementary to apertures 42 and on the otherside has pegs 47 complementary to apertures 43.

Figure 7:
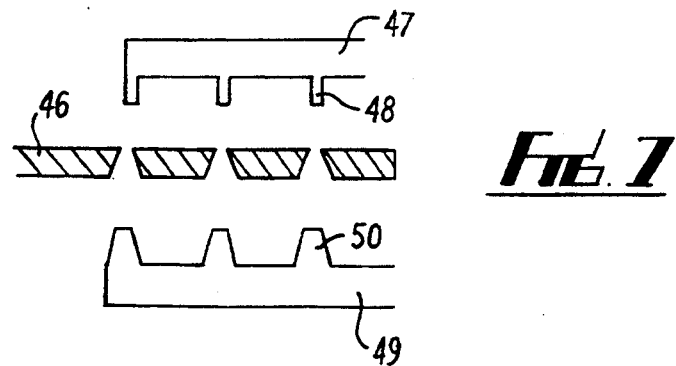
FIG. 7 is a side elevation showing a different belt end, and the different bridges.

It will be appreciated that in relation to the belt ends 26, 27 seaming can be carried out perfectly well from either side of the belt. This can be very important in the case of a dryer fabric wherein seaming from a particularly desired face may not be possible due to intruding machine structure. There may be cases, however, wherein the apertures are not of uniform cross section throughout the belt and a possible construction of such a belt is shown in FIG. 7. Here, a belt 46 (which might be a filter belt) has apertures which taper from the underside to the top. When such a belt is being seamed, it will be necessary to use a bridge 47 which has small pegs 48 when seaming from the top, and a bridge 49 which has larger tapered pegs 50 when seaming from beneath.

Figure 8:
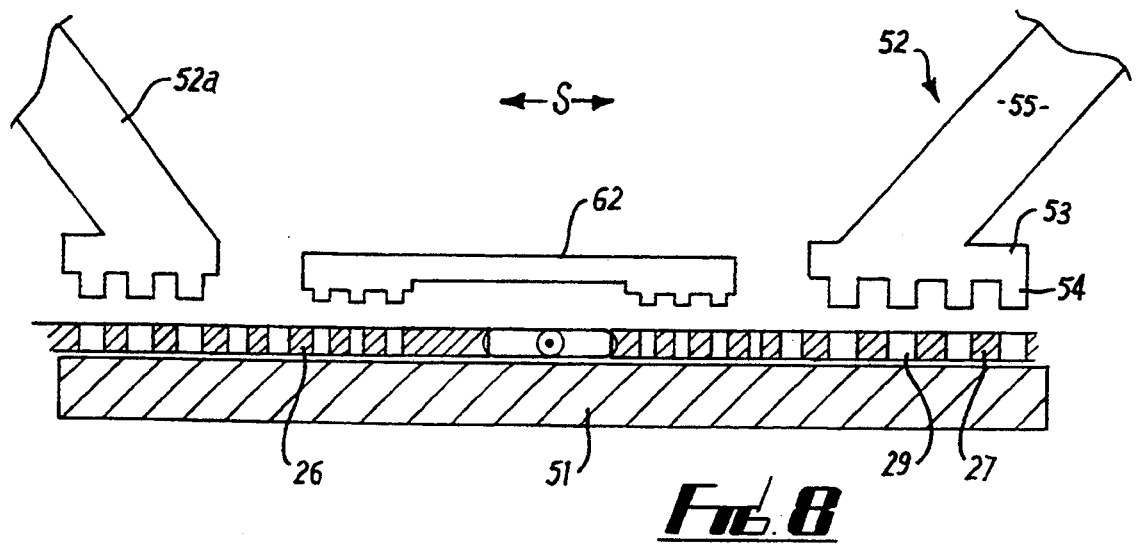
FIG. 8 is a side elevation, partly in cross section illustrating a further aspect of the invention.

FIG. 8 illustrates a further aspect of the invention. FIG. 8 is similar in many respects to FIG. 4 in that a bridge 62 is being used in relation to belt ends 26, 27 supported on a seaming platform 51. It has been described earlier how the pegs of one side of the bridge 62 can be engaged, the separation S adjusted and then the pegs on the otherside engaged. This involves relative longitudinal movement of the belt ends. As the belt can be under considerable tension, gripping the belt in order to move it can be a difficulty. To facilitate this, a tool 52 in accordance with the invention has a: foot 53 carrying a plurality of pegs 54 which are complementary to the apertures 29. A handle 55 upstands from the foot 53. The tool 52 can be used alone, or in combination with a comparable tool 52a to vary the separation S prior to locking engagement of the bridge 62.

Of course, the pegs 54 do not have to be so precise and accurate fit in the apertures as do the pegs on the bridge member and they can be quite a loose fit to enable the handle to be moved easily. They should not, however, be so small as to put undesirable stress on the walls of the apertures.

Figure 9:
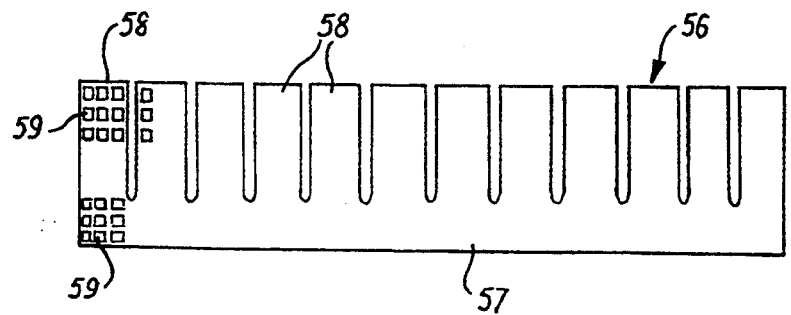
FIG. 9 illustrates another bridge of the invention.

It has been described that either a continuous length of bridge 32 or individual bridges 32 can be used as temporary seaming aids. Another possibility is for a bridge to be provided (see FIG. 9) which is in the form of a band which can extend the full length of the seam. On one side, the band forms a continuous strip 57 which is provided with pegs similar to the pegs 34. The other side of the band is split transversely of the length of the band to form a series of adjacent tongues 58 each of which is provided with a plurality of pegs 59 comparable with pegs 35. In use, the pegs 59 will normally be engaged first on one side of the seam. The separation of the seam will be adjusted (using, for example, the lines of apertures 28a, 29a and described in relation to FIG. 5) and the pegs 59 then engaged. If, in use, the pintle wire should stick it is possible to lift an individual tongue 58 to inspect a portion of the seam therebeneath to ascertain what is causing the pintle wire to stick and, if necessary, adjust the disposition of the belt ends to obviate the problem.

As mentioned, although the invention has been described in this particular description in relation to the dryer fabric of a papermaking machine, it has application in all fields of conveyor belting, filter belting, machine drive belting and in many other fields.

When the bridge is made from material, such as thermoset polyurethane, which can extend under load, it can be desirable to provide the bridge with extension-resisting reinforcement. This can take the form of inextensible yarns, wires or the like within the bridge and extending in the longitudinal belt direction. The reinforcement can be incorporated during manufacture of the bridge.

It should also be noted that the above description is by way of example only, and that many other variations can be made within the scope of the invention.

What is claimed is:

1. A combination of:
    a belt having a pair of belt ends, each belt end being provided with a plurality of apertures and two series of hinge forming formations, the two series of formations being interdigitable and engageable by a pintle wire so as to form a seam, and
    a temporary seaming bridge operative to extend between the pair of belt ends and over the seam while not interfering with the seam, the belt ends and seam being coplanar with portions of the belt defining the apertures, the bridge having, on each side, a plurality of pegs complementary to the apertures in the belt ends, the bridge being operative to engage the apertures in each end of the belt so as to maintain the two series of hinge forming formations in an interdigitated condition so that the pintle wire may be passed through the interdigitated formations and effect a joint.

2. A combination as claimed in claim 1, wherein the pegs are resiliently retained in the apertures.

3. A combination as claimed in claim 1, wherein the pegs comprise a material which is harder than a material from which the belt is made.

4. A combination as claimed in claim 3, wherein the pegs comprise a material of at least 50 Shore D hardness.

5. A combination as claimed in claim 1, wherein the bridge comprises a series of tongues extending from an elongate board, at least one of said pegs being provided on the elongate board.

6. A combination as claimed in claim 1, wherein the apertures are arranged in a regular array.

7. A combination as claimed in claim 1, wherein at least some of the apertures are arranged in a line transverse to the belt.

8. A combination as claimed in claim 1, wherein a line of apertures, at a predetermined distance from the end of the belt, are distinct from remaining ones of said apertures.

* * * * *